March 30, 1965 R. T. ADAMS ETAL 3,176,245

FREQUENCY STABILIZED OSCILLATOR

Filed May 7, 1959

INVENTORS.
ROBERT T. ADAMS
BARRY M. MINDES
BY Alfred C. Hill
AGENT 3,176,245

FREQUENCY STABILIZED OSCILLATOR

Robert T. Adams, Short Hills, N.J., and Barry M. Mindes, New York, N.Y., assignors to International Telephone and Telegraph Corporation, Nutley, N.J., a corporation of Maryland Filed May 7, 1959, Ser. No. 811,597
10 Claims. (Cl. 331—175)

Figures 1, 2:
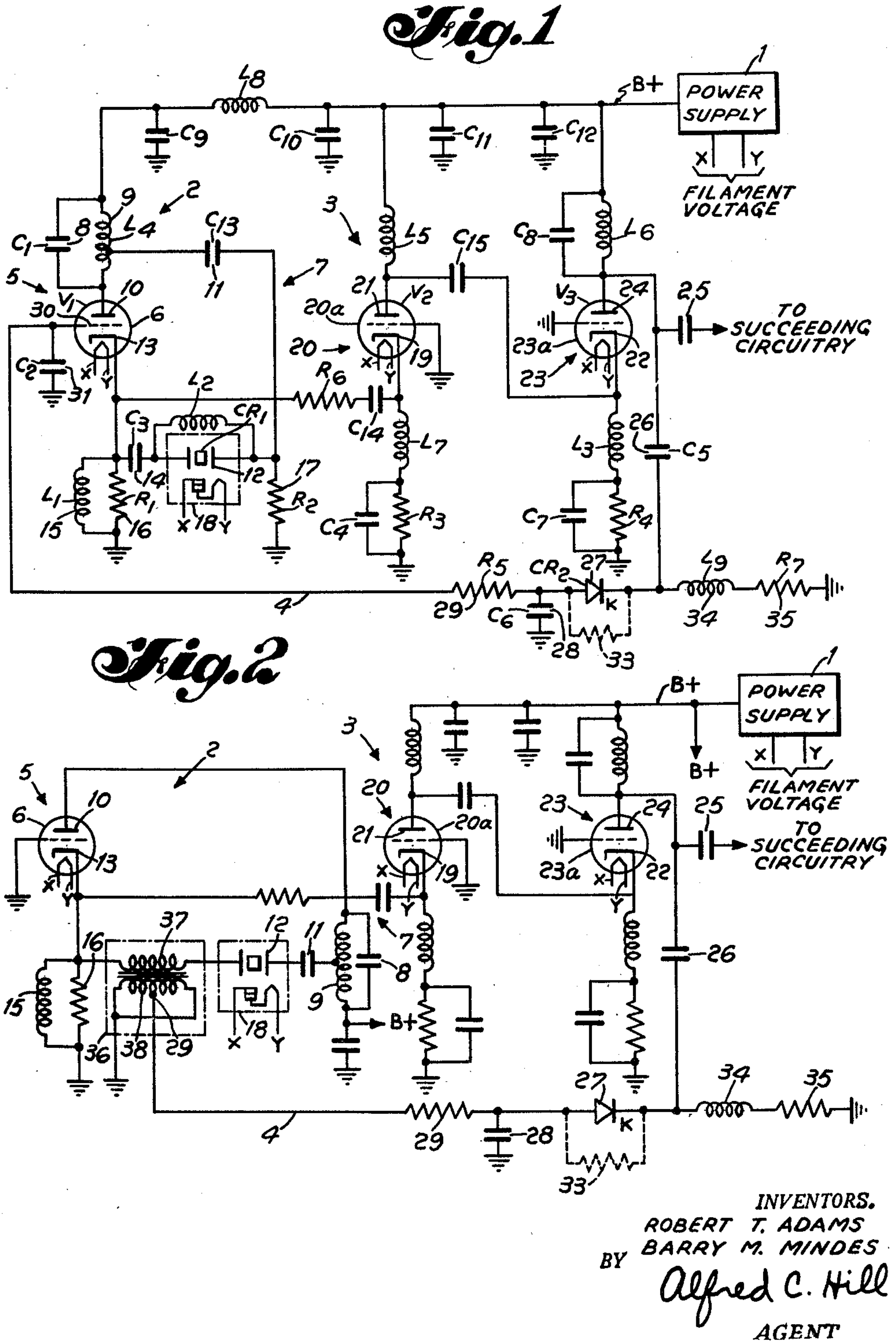

This invention relates to frequency stabilized oscillators and more particularly to automatic frequency control of an oscillator in the presence of power supply variations. This is a continuation-in-part application of our copending application, Serial No. 743,880, filed June 23, 1958, now abandoned.

Frequency instability of an oscillator may occur due to variations in the anode and/or filament voltages generated by a power supply feeding said oscillator. These power supply voltage changes cause a shift in the operating characteristics of the circuits incorporated in conjunction with the oscillator and of course in the oscillator itself, thereby changing the gain of the electron discharge devices associated with the oscillator circuit. These changes in gain due to the power supply variation if permitted to happen will change the frequency and amplitude of the output signal from the oscillator circuit. These changes in the output signal from an oscillator circuit are of course undesirable.

The usual method of correcting frequency deviations caused by line voltage variation and other variations within the power supply itself is to use regulated power supplies which will provide a high degree of regulation for the anode and filament voltages produced by the power supply and hence will provide a high degree of frequency stability. This, however, in certain applications is not accurate enough, particularly in systems, such as in over-the-horizon systems, where accuracies of a higher order, say one part in $10^7$ or more are required.

Therefore an object of this invention is to provide a frequency stabilized oscillator system which will provide a higher degree of stability than has been possible with the prior art arrangements.

Another object of this invention is to provide a frequency stabilized oscillator system including an oscillator whose frequency is stabilized to an accuracy of approximately one part in $10^8$ or more.

A further object of this invention is to provide a highly accurate frequency stabilized oscillator system that is simple and inexpensive to manufacture.

Still a further object of this invention is to provide a frequency stabilized oscillator system including an oscillator whose output frequency variations due to power supply variations are compensated for in a manner to substantially cancel said frequency variations without resorting to increasing the complexity of regulation of the power supply.

A feature of this invention is the provision of a means responsive to variations in the output voltage of the power supply associated with an oscillator circuit to give an indication of the effect of the power supply voltage variations on the operating characteristics of said responsive means and hence enable a prediction of the operating characteristic changes that take place in said oscillator circuit due to the power supply voltage variations. Said responsive means produces a control voltage to compensate for the changes in frequency that would have taken place in the oscillator circuit if permitted.

Another feature of this invention is the provision of a transducer, such as an electron discharge device, responding to variations in the output voltage of the power supply feeding the transducer and the oscillator circuit to produce a control voltage varying in accordance with the changes in the operating characteristics of the transducer produced by the variations in the output voltage of the power supply, said control voltage being applied to the oscillator circuit to compensate for changes in the desired output frequency of the oscillator due to variations in the output voltage of the power supply to maintain the signal output of the oscillator at a given frequency.

The term "transducer" employed in the specification and claims has the meaning as defined in "The International Dictionary of Physics and Electronics," D. Van Nostrand Company, Inc., 1956, pages 918–919 as follows: "A device by means of which energy can flow from one or more transmission systems to one or more other transmission systems. The energy transmitted by these systems may be of any form (for example, it may be electric, mechanical, or acoustic), and it may be of the same form or different forms in the various input and output systems." In a narrower sense the term "transducer" as employed in the present application may also be considered an "electric transducer" which is defined in the above-identified dictionary as: "A transducer in which all of the waves concerned are electric."

A further feature of this invention is the provision of a rectifying circuit at the output of the device measuring an amplitude effect of the power supply voltage change to provide a control voltage for coupling to the oscillator circuit to compensate the frequency changes in the oscillator circuit which would occur if the oscillator circuit were permitted to respond without compensation to the power supply voltage variations.

Still a further feature of this invention is the provision of a controlling element included in the oscillator circuit which responds to the control voltage applied thereto to adjust the operating characteristics of the oscillator circuit in a manner to compensate for frequency changes in the oscillator circuit due to power supply voltage variations. The controlling element may be in the form of a reactance modulator coupled in a frequency controlling relationship to the oscillator circuit or the controlling element may be the control electrode of the transducer oscillator such as an electron discharge device or transistor included in the circuit which is capacitively coupled to ground such that the bias voltage of the control voltage applied thereto will affect the operating characteristics of the oscillator circuit to compensate for frequency changes that will occur therein if the compensating voltage were not applied thereto.

Another feature of this invention is the provision of two amplifier stages including electron discharge devices or transistors at the output of the oscillator circuit with the control voltage to compensate for frequency changes induced in the oscillator circuit by power supply voltage variations being taken from the second of the stages to provide a wide swing in the control voltage to make the control system more sensistive to frequency deviations.

The above-mentioned and other features and objects of this invention will become more apparent by reference to the following description taken in conjunction with the accompanying drawings, in which:

FIG. 1 is a schematic diagram of a frequency stabilized oscillator system following the principles of this invention; and FIG. 2 is a schematic diagram of another embodiment of a frequency stabilized oscillator following the principles of this invention.

Referring to FIG. 1, there is illustrated therein a frequency stabilized oscillator system in accordance with the principles of this invention operating at a given frequency and subject to deviations from said given frequency by voltage variations at the output terminals of power supply 1. The oscillator system of this invention includes an oscillator circuit 2 for generating a signal at the given frequency, means 3 responsive to variations in the output voltage of power supply 1 to produce a control voltage varying in accordance with changes in the operating characteristics of means 3 induced by the variations in the output voltage of power supply 1 and means 4 coupling the control voltage to oscillator circuit 2 to compensate for changes in the given frequency due to variations in the output voltage of power supply 1 to thereby maintain the signal output of oscillator 2 at the given frequency.

More explicitly oscillator circuit 2 is illustrated as including a transducer 5 illustrated to be an electron discharge device 6 arranged in conjunction with the oscillating loop 7 to provide a grounded-grid-crystal-controlled oscillator. The oscillatory loop 7 of circuit 2 includes condenser 8 and inductance 9 resonant at the given frequency F coupled to anode 10 of discharge device 6. Capacitor 11 is coupled to a tap point on inductor 9 which in turn is coupled to crystal 12 and hence to cathode 13 by means of condenser 14. Inductance 15 and resistance 16 provide the cathode impedance for electron discharge device 6 and the other side of crystal 12 is returned to ground through resistor 17. Crystal 12 is contained in a crystal oven 18 for temperature stabilization in a known manner. The output of oscillator circuit 2 is coupled from cathode 13 of electron discharge device 6 and is applied to cathode 19 of a grounded-grid buffer amplifier stage including a transducer 20 illustrated as electron discharge device 20*a*. Cathode 19 of electron discharge device 20*a* functions as the input to means responsive 3. The output of electron discharge device 20*a* is coupled from anode 21 to cathode 22 of transducer 23 illustrated as electron discharge device 23*a* included in a second grounded-grid buffer amplifier. The output of electron discharge device 23*a* is taken from anode 24 and coupled through condenser 25 to succeeding circuitry, such as an amplifier multiplier of a transmitter (not shown). A portion of the output signal at anode 24 is coupled by means of condenser 26 to diode 27, which is poled to pass only a negative voltage. The output of diode 27 is coupled to capacitor 28 which is charged to the value of the output voltage from diode 27, said output voltage being a rectified version of that portion of the output signal of electron discharge device 23*a* coupled thereto. Condenser 28 follows smoothly variation in the output voltage of diode 27 and hence the output signal of electron discharge device 23*a*. The voltage stored on condenser 28 is the control voltage varying in accordance with changes in the operating characteristics of electron discharge device 23*a*, a portion of means 3, induced by the variations in the output voltage of power supply 1. Resistor 29 couples the control voltage on condenser 28 to oscillator circuit 2 by means of conductor 4. As illustrated in FIG. 1, the control voltage is coupled to grid 30 of electron discharge device 6. Grid 30 is connected to ground for alternating current signals by means of condenser 31. With this arrangement, it is possible to apply the negative D.C. (direct current) voltage at the output of diode 27 to grid 30 to thereby compensate for frequency changes that attempt to take place in oscillator circuit 2 due to variations in the voltage output of power supply 1. The control voltage coupled to grid 30 is in the form of a negative bias voltage on device 6 which value varies in accordance with the variations in the output signal at anode 24 of the electron discharge device 23*a*.

The value of resistor 29 is determined experimentally in conjunction with the tube types and circuit parameters employed in the circuit and with power supply 1 providing normal voltages so that a certain negative bias is applied to control grid 30 to provide a signal at a given operating frequency at the output of oscillator 2. As the voltage at the output of power supply 1 varies the dynamic characteristic of electron discharge device 23*a* will vary producing a change in the output level due to a change in the amplification of electron discharge device 23*a*. This change in output signal level is an indication of the effect of the supply voltage changes on electron discharge device 6. Diode 27 will thus provide the necessary control voltage for coupling to grid 30 to vary the negative bias thereon to compensate for the changes in frequency in oscillator circuit 2 and hence counteracts the effect that would have been produced by variations in the voltage of power supply 1 had not the compensating control voltage been applied thereto.

The operation of the circuit may be described as follows: A variation in the voltage at the output of power supply 1 causes a change of variation in the dynamic characteristics of the electron discharge devices 6, 20*a* and 23*a*. Diode 27 is coupled to the output of electron discharge device 23*a* and passes a negative voltage proportional to the change in the level at the output of electron discharge device 23*a* and hence an indication of a change of gain that took place in the electron discharge device 23*a*. The changes that take place in electron discharge device 23*a* enables a prediction of the changes that will take place in oscillator circuit 2 and particularly in the dynamic characteristics of electron discharge device 6. Gain changes in oscillator circuit 2 due to the power supply variation would, if permitted, change the frequency and amplitude of the output signal from the anode 21 of electron discharge device 20*a*. Electron discharge device 23*a* causes an additional amplitude change in the output signal sufficient to supply through diode 27 a compensating control voltage to grid 30 of oscillator circuit 2 to overcome the oscillator amplitude change. If the control voltage overcomes the amplitude changes at the output of oscillator circuit 2, as is accomplished by the circuit arrangement hereindescribed, then only the gain changes of electron discharge device 23*a* are operating to supply compensating control voltages. Thus electron discharge device 23*a* is a measure of what would have occurred in oscillator circuit 2 if it were not compensated by the output of diode 27 in a manner to maintain the signal output of oscillator circuit 2 at the given frequency F. As can be observed from the above discussion the gain of electron discharge device 23*a* is affected only by variations in the voltage output of power supply 1. The attempted change in frequency at the output of oscillator circuit 2 will have no measurable effect on the gain of electron discharge device 23*a* because the tuned circuit in the anode circuit 24 of electron discharge device 23*a* is a low Q type circuit and hence can have little or no effect on the gain of electron discharge device 23*a*, the oscillator circuit 2 is crystal controlled and hence will have no readily measurable frequency change, and the control voltage delivered by diode 27 and condenser 28 prevents any frequency change in the oscillator circuit 2. The compensation provided by the circuitry of this invention is so good that it was impossible to measure frequency or amplitude changes at the output of oscillator circuit 2. It has been determined that the oscillator circuit 2 has a frequency change of one part in $10^8$ for small supply voltage changes.

It has been indicated in the circuit of FIG. 1 that the feedback voltage be taken from electron discharge device 23*a*. It is obvious of course that this feedback voltage or compensating voltage could be taken from electron discharge device 20*a*. However, it is preferred that the feedback voltage be taken from the output of electron discharge device 23*a* since it has been found that the variation in output amplitude of electron discharge device 20*a* would be insufficient to provide the wide swing in the control voltage that is necessary to make this system extremely sensitive to frequency deviations.

As pointed out hereinabove the control circuit of this invention provides a compensating control voltage for application to grid 30 of electron discharge device 6. The application of this control voltage grid 30 adjusts the dynamic characteristics of electron discharge device 6 which have been altered by variations in power supply 1 from the desired dynamic characteristics to produce the given frequency. The adjustment of the dynamic characteristics change the characteristics, such as the transconductance and the gain of electron discharge device 6, but do not restore them to their original value. This adjustment might tend to change the amplitude of the output signal of oscillator circuit 2. However, we are not concerned with this since the only purpose of our control circuit is to compensate for frequency changes which would occur, if permitted, by variations in the voltage output of power supply 1. Hence, any change in the other operating characteristics of oscillator circuit 2 is immaterial to the purpose of this circuit.

Diode 27 operates to rectify a portion of the output signal coupled from electron discharge device 23*a* and hence provides a rectified output signal varying in accordance with the changes in the gain of electron discharge device 23*a*. This slow variation of rectified signal is stored in condenser 28 whose charge also varies in step with the rectified signal output. Resistor 33 shown dotted is representative of the back resistance of crystal diode 27. While this is inherent in crystal diode 27, a physical resistor would be necessary if an ideal rectifier of the vacuum diode type were substituted for the crystal diode 27. The back resistance of the crystal diode or the physical resistance for the ideal rectifier of vacuum type is necessary to provide a discharge path for condenser 28 to ground through inductance 34 and resistor 35 to prevent the impedance of resistor 29 and condenser 28 from storing negative bias thereon should the voltage at the output of electron discharge device 23 swing highly positive cutting off rectifier 27. This discharge path permits condenser 19 to only follow changes in the control voltage amplitude and prevents the accumulation of charge thereon which would be detrimental to the operation of this circuit as a frequency stabilizing circuit.

Referring to FIG. 2, there is illustrated another embodiment of the frequency stabilized oscillator system following the principles of this invention. The circuit is substantially identical to that illustrated in FIG. 1 and operates in substantially the same manner, like parameters being identified by the reference characters employed in connection with the discussion of FIG. 1. The major difference between the embodiment of FIG. 1 and the embodiment of FIG. 2 is the arrangement in oscillator circuit 2 to compensate for frequency changes that attempt to take place as the voltage of power supply 1 varies. The frequency compensating or controlling element is illustrated to be a reactance modulator 36 responding to the control voltage coupled through conductor 4 from the output of diode 27. Reactance modulator 36 is illustrated as a saturable reactor including a primary winding 37 and a polarizing winding 38. The polarizing winding 38 is tapped at point 39 to receive the control voltage varying in proportion to variations in the output signal at the anode 24 of electron discharge device 23*a*. The polarizing winding 38 responds to the control voltage to adjust the magnetic flux field in primary winding 37 to that the dynamic characteristics of electron discharge device 6 are controlled substantially as indicated with reference to the circuit of FIG. 1 to compensate for frequency variations that would occur, if permitted, by variations in the voltage of the output of power supply 1. An example of a suitable saturable reactor for use in this circuit is the "Increductor" manufactured by STC Laboratories of Stamford, Connecticut.

While the discussion hereinabove has been directed to circuits employing electron discharge devices it is to be understood that this same principle could be applied to circuitry employing transistors with exactly the same end result.

In a reduction to practice of this invention where the oscillator is operated at the frequency of 50 megacycles, the parameters for the circuit elements of the schematic of FIG. 1 were as follows:

| | |
|---|---|
| $C_1$, $C_8$ | Capacitor 5 $\mu\mu$f. |
| $C_2$, $C_4$, $C_6$, $C_7$, $C_9$, $C_{10}$, $C_{11}$, $C_{12}$ | Capacitor 1000 $\mu\mu$f. |
| $C_3$, $C_5$, $C_{13}$, $C_{14}$, $C_{15}$ | Capacitor 470 $\mu\mu$f. |
| $CR_1$ | Crystal CR 32/$\mu$. |
| $CR_2$ | Crystal diode IN34A. |
| $L_1$, $L_3$, $L_7$, $L_9$ | Inductance 0.47 $\mu$h. |
| $L_2$ | Inductance 2.2 $\mu$h. |
| $L_4$ | Inductance 3.0 $\mu$h. |
| $L_5$, $L_8$ | Inductance 5.6 $\mu$h. |
| $L_6$ | Inductance 3.0 $\mu$h. |
| $R_1$ | Resistor 560 ohms. |
| $R_2$ | Resistor 180 ohms. |
| $R_3$, $R_4$ | Resistor 470 ohms. |
| $R_5$ | Resistor 150K ohms. |
| $R_6$ | Resistor 1500 ohms. |
| $R_7$ | Resistor 56K ohms. |
| $V_1$, $V_2$, $V_3$ | ½ tube type 12AT7. |
| B+ | Anode voltage 150 volts. |
| XY | Filament voltage 6.3 volts. |

While we have described above the principles of our invention in connection with specific apparatus, it is to be clearly understood that this description is made only by way of example and not as a limitation to the scope of our invention as set forth in the objects thereof and in the accompanying claims.

We claim:

1. A frequency stabilized oscillator system operating at a given frequency and subject to deviation therefrom due to power supply voltage variations comprising an oscillator circuit for generating a signal at said given frequency including a reactance modulator and a first transducer, means coupling said reactance modulator to said first transducer, a second transducer responsive to variations in the output voltage of said power supply, means coupling the output of said first transducer to the input of said second transducer, means coupled to the output of said second transducer to produce a control voltage varying in accordance with changes in the amplification of said second transducer produced by said variations in the output voltage of said power supply and means coupling said voltage to said reactance modulator to compensate for changes in said given frequency due to said variations in the output voltage of said power supply to maintain said signal at said given frequency.

2. A frequency stabilized oscillator system operating at a given frequency and subject to deviation therefrom due to power supply voltage variations comprising an oscillator circuit for generating a signal at said given frequency including a reactance modulator and a first electron discharge device having at least a cathode, means coupling said reactance modulator to the cathode of said first discharge device, an amplifier circuit including at least a second electron discharge device coupled to the output of said first discharge device responsive to variations in the output voltage of said power supply, means coupled to the output of said second discharge device to produce a control voltage varying in accordance with changes in the amplification of said second discharge device produced by said variations in the output voltage of said power supply and means coupling said control voltage to said reactance modulator to compensate for changes in said given frequency due to said variations in the output voltage of said power supply to maintain said signal at said given frequency.

3. A frequency stabilized oscillator system operating at a given frequency and subject to deviation therefrom due to power supply voltage variations comprising an oscillator circuit for generating a signal at said given frequency, a frequency controlling element included in said oscillator circuit, means coupled to the output of said oscillator circuit responsive to variations in the output voltage of said power supply to produce a control voltage varying in accordance with changes in the operating characteristics of said responsive means produced by said variations in the output voltage of said power supply and means coupling said control voltage to said frequency controlling elements to adjust the operating characteristics of said oscillator circuit to compensate for changes in said given frequency due to said variations in the output voltage of said power supply to maintain said signal at said given frequency.

4. A frequency stabilized oscillator system operating at a given frequency and subject to deviation therefrom due to power supply voltage variations comprising an oscillator circuit for generating a signal at said given frequency, a frequency controlling element included in said oscillator circuit, a transducer coupled to the output of said oscillator circuit responsive to variations in the output voltage of said power supply, means coupled to the output of said transducer to produce a control voltage varying in accordance with changes in the operating characteristics of said transducer produced by said variations in the output voltage of said power supply and means coupling said control voltage to said frequency controlling element to adjust the operating characteristics of said oscillator circuit to compensate for changes in said given frequency due to said variations in the output voltage of said power supply to maintain said signal at said given frequency.

5. A frequency stabilized oscillator system operating at a given frequency and subject to deviation therefrom due to power supply voltage variations comprising an oscillator circuit for generating a signal at said given frequency, a frequency controlling element included in said oscillator circuit, an amplifier circuit including at least one electron discharge device coupled to the output of said oscillator circuit responsive to variations in the output voltage of said power supply, means coupled to the output of said discharge device to produce a control voltage varying in accordance with changes in the operating characteristics of said discharge device produced by said variations in the output voltage of said power supply and means coupling said control voltage to said frequency controlling element to compensate for changes in said given frequency due to said variations in the output voltage of said power supply to maintain said signal at said given frequency.

6. A frequency stabilized oscillator system operating at a given frequency and subject to deviation therefrom due to power supply voltage variations comprising an oscillator circuit for generating a signal at said given frequency including a first electron discharge device and a frequency controlling element, at least a second electron discharge device coupled to the output of said first electron discharge device responsive to variations in the output voltage of said power supply, means coupled to the output of said second discharge device to produce a control voltage varying in accordance with changes in the amplification of said second discharge device produced by said variations in the output voltage of said power supply and means coupling said control voltage to said frequency controlling element to compensate for changes in said given frequency due to said variations in the output energy of said power supply to maintain said signal at said given frequency.

7. A system according to claim 6, wherein said means to produce said control signal comprises a rectifier circuit including a diode coupled to the output of said second discharge device and a condenser coupled between the output of said diode and ground potential to provide a direct current voltage varying in accordance with the variations of the output signal of said second discharge device and said means coupling said control voltage includes a resistor coupled to the output of said diode and said condenser to couple said direct current voltage to said frequency controlling element.

8. A frequency stabilized oscillator system operating at a given frequency and subject to deviation therefrom due to power supply voltage variations comprising an oscillator circuit for generating a signal at said given frequency including a reactance modulator as a frequency controlling element, a first electron discharge device having at least a cathode and a control grid, means coupling said control grid directly to ground potential and means coupling said reactance modulator to said cathode, at least a second electron discharge device coupled to the output of said first electron discharge device responsive to variations in the output voltage of said power supply, means coupled to the output of said second electron discharge device to produce a control voltage varying in accordance with changes in the amplification of said second discharge device produced by said variations in the output voltage of said power supply and means coupling said control voltage to said reactance modulator to compensate for changes in said given frequency due to said variations in the output voltage of said power supply to maintain said signal at said given frequency.

9. A frequency stabilized oscillator system operating at a given frequency and subject to deviation therefrom due to power supply voltage variations comprising a power supply having voltage output terminals, an oscillator circuit for generating a signal at said given frequency coupled to said output terminals, a frequency controlling element included in said oscillator circuit, means coupled to the output of said oscillator circuit and said output terminals responsive to variations in the output voltage of said power supply to produce a control voltage varying in accordance with changes in the operating characteristics of said responsive means produced by said variations in the output voltage of said power supply and means coupling said control voltage to said frequency controlling element to adjust the operating characteristics of said oscillator circuit to compensate for changes in said given frequency due to said variations in the output voltage of said power supply to maintain said signal at said given frequency.

10. A frequency stabilized oscillator system operating at a given frequency and subject to deviation therefrom due to the power supply voltage variations comprising an oscillator circuit including an oscillatory loop for generating a signal at said given frequency, a frequency controlling element disposed in said oscillatory loop, means responsive to variations in the output voltage of said power supply to produce a control voltage varying in accordance with changes in the operating characteristics of said responsive means produced by said variations in the output voltage of said power supply and means coupling said control voltage to said frequency controlling element to compensate for changes in said given frequency due to said variations in the output voltage of said power supply to maintain said signal at said given frequency.

References Cited by the Examiner

UNITED STATES PATENTS

| | | | |
|---|---|---|---|
| 2,343,539 | 3/44 | Edson | 331—176 |
| 2,683,852 | 7/54 | Sampson | 321—18 |
| 2,743,369 | 4/56 | Sands | 331—175 |
| 2,756,335 | 7/56 | Snyder | 331—175 |
| 2,811,647 | 10/57 | Nilssen | 331—175 |

ROY LAKE, *Primary Examiner.*

HERMAN K. SAALBACH, GEORGE M. WESTBY, BENNETT G. MILLER, JOHN KOMINSKI, *Examiners.*